J. LUDEKE.
Wagon Brake.

No. 94,622.

Patented Sept. 7, 1869.

Witnesses:

Inventor:

United States Patent Office.

JOHN LUDEKE, OF GRIFFIN'S CORNERS, NEW YORK, ASSIGNOR TO HIMSELF AND JACOB BIEHLER, OF SAME PLACE.

Letters Patent No. 94,622, dated September 7, 1869.

IMPROVED WAGON-BRAKE.

The Schedule referred to in these Letters Patent and making part of the same.

*To all whom it may concern:*

Be it known that I, JOHN LUDEKE, of Griffin's Corners, in the county of Delaware, and State of New York, have invented a new and improved Wagon-Brake; and I do hereby declare that the following is a full, clear, and exact description thereof, which will enable others skilled in the art to make and use the the same, reference being had to the accompanying drawing, forming part of this specification, in which—

Similar letters of reference indicate corresponding parts.

Figure 1:
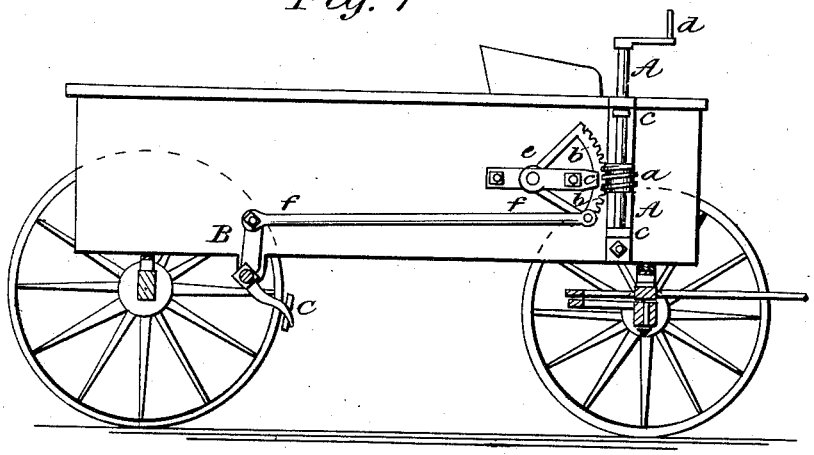
Figure 1 represents a side elevation of a wagon provided with my improved brake.
Figure 2:
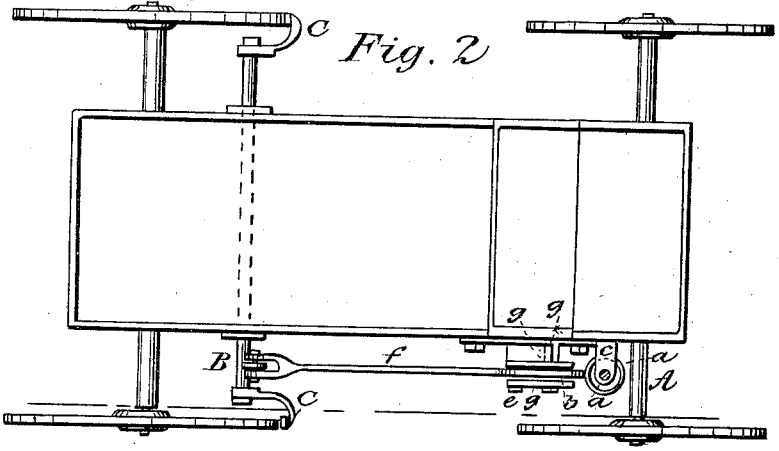
Figure 2 is a plan or top view of the same.

This invention relates to a new wagon-brake, which is so arranged that the driver can, when he applies the brake, let go the lever without thereby releasing the brake. The wagon-brakes heretofore in use were generally so constructed that a lever, pivoted to the side of the wagon, was, by a rod, connected with the brake-lever. Whenever the lever was swung backward, the brake was applied, but, as soon as released, the brake would also be thrown off the wheel. This is, in some cases, very inconvenient, as a driver, having unruly horses, may require both hands on the reins, and will not be able to attend continually to the brake. With my invention the brake will remain applied, unless thrown off intentionally.

The invention consists in the application of a worm, $a$, and toothed segment $b$, to the brake.

The worm is formed on and part of a vertical shaft, A, which has its bearings in bars $c\ c$, that project from the side of the wagon, and which has a crank-handle, $d$, as shown.

The segment is pivoted, by a pin, $e$, to the wagon, meshes into the worm, and is, by a rod, $f$, connected with the brake-lever B.

When the shaft A is turned, the brake C will be applied, and will remain so until the shaft is turned back in the opposite direction.

The segment is confined between two side plates, $g\ g$, which prevent it from springing sideways under the great strain to which it may be exposed.

Having thus described my invention,

What I claim as new, and desire to secure by Letters Patent, is—

The combination of the worm-shaft $a$, sector-rack $b$, and pitman $f$, all arranged in the same vertical plane, on the side of the wagon, with the vibrating shaft B, and rubbers C C, arranged and operating as shown and described.

JOHN LUDEKE.

Witnesses:
 NOAH BEADLE,
 WM. A. TEN BROECK.